July 30, 1968    H. NICOLAY ETAL    3,394,779
PRESSURE OPERATED BRAKING DEVICE FOR VEHICLES
Filed June 13, 1966    4 Sheets-Sheet 1

Inventors

July 30, 1968   H. NICOLAY ETAL   3,394,779
PRESSURE OPERATED BRAKING DEVICE FOR VEHICLES
Filed June 16, 1966   4 Sheets-Sheet 4

Inventors

United States Patent Office 3,394,779
Patented July 30, 1968

3,394,779
PRESSURE OPERATED BRAKING DEVICE FOR VEHICLES
Heinz Nicolay, Heidelberg, and Franz Beigel, Malschenberg, Germany, assignors to Graubremse G.m.b.H., Heidelberg, Germany, a corporation of Germany
Filed June 16, 1966, Ser. No. 557,976
Claims priority, application Germany, Mar. 21, 1966, G 46,358
8 Claims. (Cl. 188—170)

ABSTRACT OF THE DISCLOSURE

A pressure operated braking device for vehicles, which comprises a force storing device including a spring adapted to be tensioned by pressure means, and a braking linkage operatively connected with the spring force storing device such, that brakes are applied. The braking linkage is disposed between the spring force storing device and the brakes, and means are provided for releasing the braking effect caused by the spring force storing device. Two brake shafts are arranged and wheel brakes are mounted on a vehicle axle and operatively connected with the brake shafts. Operating levers are mounted on the brake shafts which are operated upon activating the pressure operated spring force storing device, which is operatively connected with the operating levers. One of the operating levers is freely rotatable on the corresponding of the brake shafts and the other of the operating levers is keyed to the other corresponding of the brake shafts. Also adjustable means are provided for supporting the other of the operating levers on the one of the operating levers.

---

The present invention relates to a pressure operated braking device for vehicles in general and to such device having a spring force storage device, in particular, adapted to be tensioned by the hydraulic fluid and which storing device is connected with the brake linkage such, that upon failure of the hydraulic fluid, the brakes are actuated.

Known devices of this type have the disadvantage that it is difficult to loosen the brakes again, after braking has once been effected by the spring force storing device. In general, this was only possible after the disturbance in the hydraulic brake system had been eliminated.

It is one object of the present invention, to provide a pressure operated braking device for vehicles, wherein these defects are eliminated.

It is another object of the present invention to provide a pressure operated braking device for vehicles, wherein a spring force storage cylinder which is variable as to its length between the spring force storage device and the brake, in order to release the braking produced by the spring force storage device, and/or acted upon by the hydraulic fluid, is provided with an additional, mechanically, pneumatically, or hydraulically operated tensioning device for the force-storage spring. In this way the possibility is afforded of releasing, by very simple means, the braking action by the spring force storage device, even if the hydraulic brake system in the vehicle is not yet operative again.

It is yet another object of the present invention to provide a pressure operated braking device for vehicles, wherein in the brake linkage a crank-drive or spindle-drive mechanism is arranged, which makes it possible to lengthen the brake linkage, when the spring force storage device is released. Similarly, adjustabe transmission levers or the like can also be provided in the brake linkage.

It is a further object of the present invention to provide a pressure operated braking device for vehicles, wherein a tensioning device for the force storage spring is arranged, which can also be designed as a crank-drive or spindle-drive mechanism or as a working cylinder piston adapted to be actuated hydraulically or pneumatically. Similarly, a ratchet or a locking mechanism can also be used as tensioning device.

It is still a further object of the present invention to provide a pressure operated braking device for vehicles, wherein in addition to the device for changing the length of the brake linkage, there is also used at the same time an additional tensioning device for the force-storage spring.

With these and other objects in view which will become apparent in the following detailed description, the present invention will be clearly understood in connection with the accompanying drawings, in which.

Figure 1:
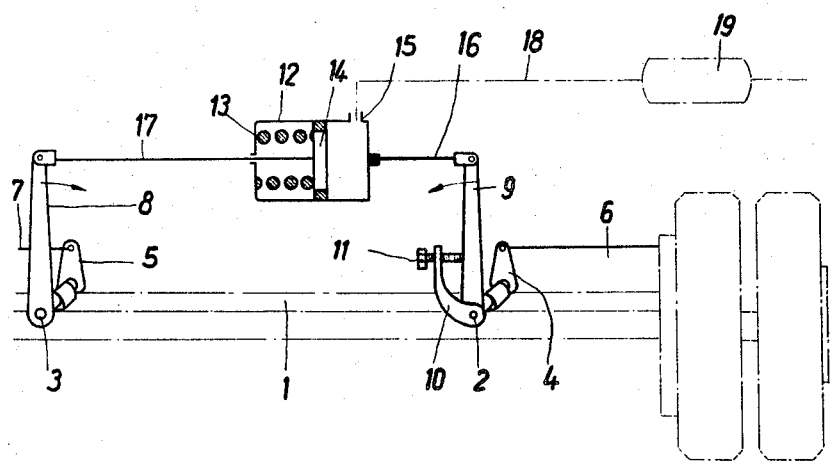
FIGURE 1 is a schematic view of a spring force storage device, a member of variable length being interposed in the brake linkage.

Referring now to the drawings, and in particular to FIG. 1, the device comprises two shafts 2 and 3 supported on a vehicle axle 1, a lever 4 and 5, respectively, being keyed to the corresponding shafts 2 and 3, which levers 4 and 5, in their turn, are connected with brake rods 6 and 7, respectively, in conventional manner by means of which wheel brakes (not shown) are actuated. A lever 8 is likewise firmly keyed onto the shaft 3, while a corresponding lever 9 is freely rotatable on the shaft 2. The lever 9 rests against a set screw 11, which is screwed into a lever 10 keyed rigidly onto the shaft 2.

Between the two levers 8 and 9 is disposed a spring force storage device 12 including a force storage spring 13 arranged therein and a piston 14, as well as a branch 15 for feeding compressed air. To the inlet branch 15, there is connected the compressed air conduit 18, which leads to the main tank 19 containing pressurized air of the hydraulic brake system of the vehicle.

Compressed air is fed from the air tank 19 by means of the conduit 18 and the branch 15 into the cylinder 12, whereby the piston 14 is subjected to pressurized air and moved back against the action of the force storage spring 13. In normal vehicle operation, the force storage spring 13 is continuously tensioned in this manner. If the cylinder 12 is bleeded, i.e. the piston 14 is released, the spring 13 relaxes and by means of an interposed brake linkage 16 and 17 as well as 2 to 9, the wheel brakes are acted upon on both sides.

If at this moment the brakes are to be released, it is merely necessary, to loosen the set screw 11, whereby the brake linage is for all practical purposes increased in length. The vehicle can then be moved again with the brakes being released. As soon as the disturbance in the hydraulic brake system has been removed and the air tank 19 has again been filled, a renewed acting of the spring force storage cylinder can again take place by compressed air. In this manner the piston 14 performs a stroke again in the cylinder 12 and the spring 13 is again tensioned. At this moment the set screw 11 is again tightened to the necessary amount, so that upon a subsequent braking, the normal braking conditions are again present.

Figure 2:
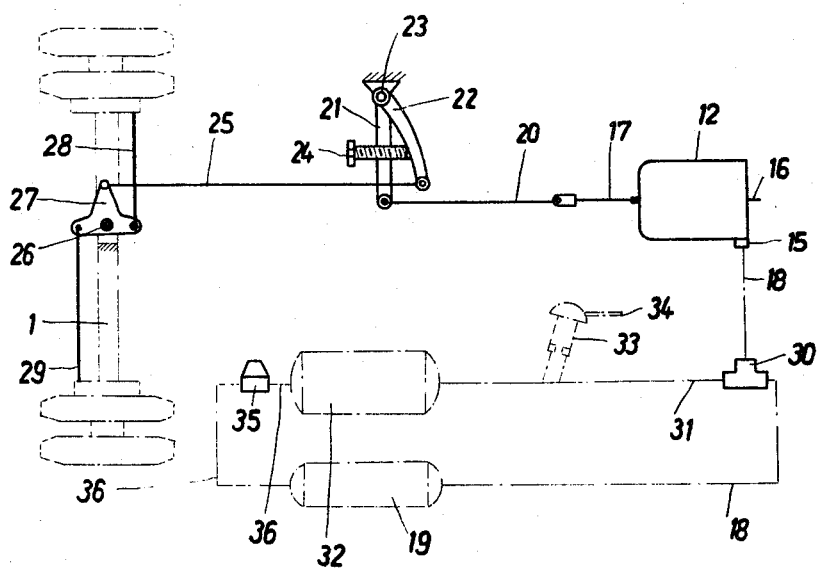
FIG. 2 is a schematic view of a brake system with a hydraulically actuated spring storage device cooperating with an additional compressed air container for tensioning against the spring force storage device, in case of failure of the compressed air.

Referring now again to the drawings, and in particular to FIG. 2, a lever 27 supported on a pivot 26 is interposed between the brake rods 28 and 29 leading to the wheel brake cylinders. A brake cable formed of two parts 20 and 25 acts simultaneously on the lever 27, the end of the brake cable being connected with a piston rod 17 of a spring force storage piston. Between the two lengths of the cables 20 and 25, there are interposed two levers 21 and 22, which are freely rotatably mounted on an axle 23. Both levers 21 and 22 are supported against each other by means of a set screw 24. By unscrewing or screwing-in the set screw 24, the length of the brake linkage can be varied. When the spring force storage cylinder 12 is free of compressed air, the force storage spring relaxes, so that the piston together with the piston rod 17 is forced fully into the cylinder 12. This brings about application of the brakes. By unscrewing the set screw 24, the brakes can again be loosened.

Furthermore, in the case of the arrangement shown in FIG. 2, an additional possibility of tensioning the spring force storage device 12 is provided, insofar as in this case aside from the main air tank 19 there is also provided a reserve air tank 32. The latter can be fed separately from the main air tank 19 or it is charged with compressed air from the main air tank 19 by means of a conduit 36 and a by-pass valve 35. In the conduit 18 leading from the main air tank 19 to the spring force storage cylinder 12, there is interposed a two-way valve 30, to which at the same time the reserve air tank 32 is connected by means of a conduit 31. A manual valve 33 equipped with a manual lever 34 is disposed in the conduit 31.

Normally the charging of the spring force storage cylinder 12 with compressed air takes place from the main air tank 19. The reserve air tank 32 is in this case always charged with compressed air. If the main air tank 19 fails or if the hydraulic fluid escapes from the brake system of the vehicle, the force storage spring enters into action, relaxes and applies the brakes. If the brakes are to be loosened at this moment again, this can of course be done by unscrewing the screw 24 at the levers 21 and 22 or the reserve air tank 32 and the manual valve 33 can be used to feed compressed air from the reserve air tank 32 into the spring force storage cylinder 12 and thus, to tension again the force storage spring by means of the piston provided therein.

Figure 3:
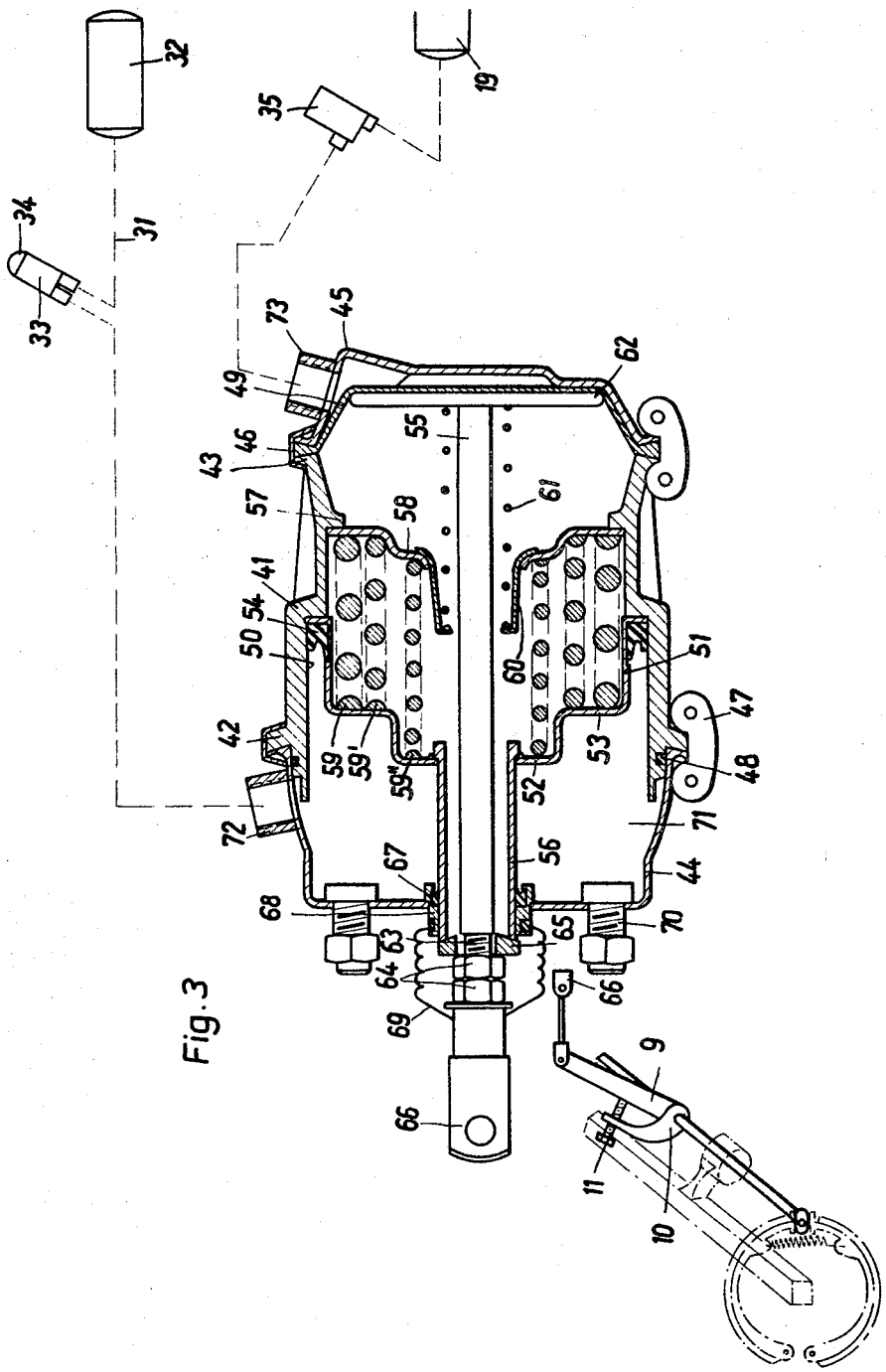
FIG. 3 is a schematic axial section of the brake system which cooperates with a combined brake and spring force storage cylinder.

Referring now to the embodiment of the device disclosed in FIG. 3, the spring force storage cylinder is combined with a diaphragm cylinder, which serves the purpose of operational braking. This combination results in a simplified construction of the overall brake system.

The spring force storage cylinder comprises a center piece 41, which has at its ends beads or mouths 42 and 43, respectively, for the placing thereon closure covers 44 and 45. The latter are rigidly secured by clamping rings 46 and clamps 47, respectively, to the center piece 41 of the cylinder. Between the center piece 41 and the front closure cover 44, there is inserted a sealing ring 48, while between the rear closure cover 45 and the mount 43, a diaphragm piston 49 is clamped in.

In the front part, the center piece 41 forms a guide cylinder 50 for the spring force storage piston 51, which is, for instance, pressed out of sheet metal and provided with depressions 52 and 53 and bears a piston packing ring 54. By means of the part 52 the piston 51 is welded to a bushing 56 which surrounds and is spaced apart from a piston rod 55. Opposite the piston 51, the center piece 41 forms an inner collar 57, a shoulder or the like for a plate 58 on which the springs 59, 59' and 59" rest, which form the force-storage springs. On the other hand, the plate 58 in its center forms a guide for an insert 60, in which a return spring 61 for the piston system is arranged.

The piston rod 55 passes through the center piece 41 lengthwise and carries at its rear end a plate 62 for the diaphragm piston. At the front end, there is provided a threaded extension 63, on which a spherical abutment plate 65 is secured by means of nuts 64. In a head 66, which is also screwed onto the extension 63, the piston rod 55 is connected with the brake linkage or with the piston of another working cylinder.

The bushing 56, which is seated on the force-storage piston 51, surrounds the piston rod 55 and is passed, with the interposition of a packing ring 67, through a guide bushing 68 in the front cylinder cover 44. The bushing 68 is connected on the outside by means of a stretchable rubber bellows 69 with the head 66 on the piston rod 65. Furthermore, in the cover 44, there are provided also fastening screws 70, by means of which the piston system can be fastened to a support plate. Finally, there are also bent out of the material of the cover 44 in inward direction ribs or corrugations 71, against which the spring force storage piston 51 abuts and which limit the forward stroke of the piston 51, respectively. Since the guide sleeve 56 of the piston 51 engages merely loosely the spherical pressure piece 65, which is seated on the piston rod 55, the diaphragm piston 49, 62 can carry out an even larger stroke independently of the piston 51. For the charging of the spring force storage device, compressed air is used in the same manner, as in the embodiment disclosed in FIG. 2 from the storage tank 32, the air entering through the connecting branch 72 in the cover 44 in front of the force storage piston 51.

The diaphragm piston 49, 62 is charged with compressed air from the tank 19 during operational braking, which air is fed through the connecting branch 73 in the rear cover 45 upon depression of the foot pedal 35.

Figure 4:
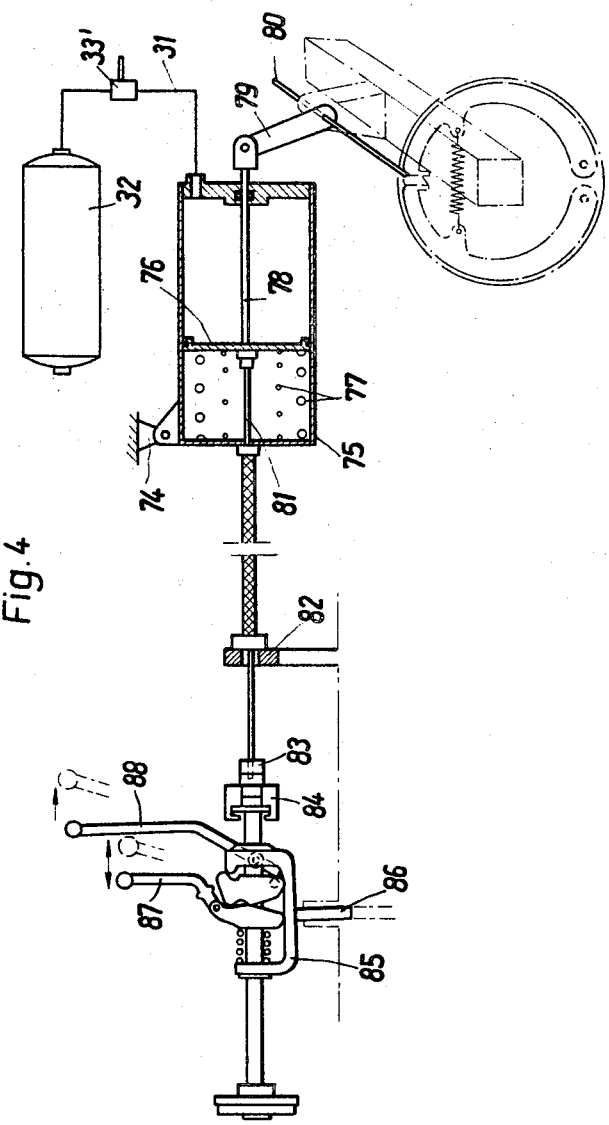
FIG. 4 is an elevation, partly in section, of another embodiment of the brake system in which the spring force storage cylinder is adapted to be tensioned again by a device which can also be used as a car jack.

Referring now again to the drawing, and in particular to FIG. 4, another embodiment of the device is disclosed. Here, a spring force storage cylinder 75 is used which receives in its center the piston 76 which is seated on the piston rod 78, which piston 76 is charged, on the one hand, by the force storage spring 77, while on the other hand, it is under the effect of compressed air, which, after the opening of the shut-off valve 33' passes from the storage tank 32 by means of the conduit 31 into the cylinder 75. A brake lever 79 seated on the brake shaft 80 acts on the piston rod 78. Furthermore, the spring force storage cylinder 75 is suspended at a support point 74 from the chassis of the vehicle.

The additional tensioning device for this spring force storage cylinder is formed in this case of a conventional car jack 85, which can be inserted by its mount 86 in a suitable projection of the vehicle chassis. This car lift 85 has the customary jacking lever 87 and release lever 88 and finally a coupling member 84, by which it can be moved over a counter-coupling member, which is secured to the end of a bowden cable 81. The cable 81 is connected to the piston 76 and passed through the bowden cable sheathing and a mount 82 on the chassis of the vehicle, respectively. At the end of the cable, there is provided an abutment 83, which limits the pulling-in movement of the cable.

If, in case of failure of compressed air, the spring force storage device responds and, that means, the force storage spring 77 is relaxed, the coupling member provided on the end of the cable is seated closely in front of the mount 82, so that its car lift, which is carried along in the tool box, can be attached and actuated without difficulty. By means of the jack lift, the force storage piston 76, will, in case of need, be pulled back against the action of the spring 77 by means of the cable 81.

While we have disclosed several embodiments of the present invention, it is to be understood that these embodiments are given by example only and not in a limiting sense, the scope of the present invention being determined by the objects and the claims.

We claim:

1. A pressure operated braking device for vehicles, comprising:

a force storing device including a spring adapted to be tensioned by pressure means, a braking linkage operatively connected with said spring force storing device such, that brakes are applied, said braking linkage being disposed between said spring force storing device and said brakes, means for releasing the braking effect caused by said spring force storing device, two brake shafts, wheel brakes mounted on a vehicle axle and operatively connected with said brake shafts, operating levers mounted on said brake shafts, said brake shafts being operated upon activating said pressure operated spring force storing device, the latter being operatively connected with said operating levers, one of said operating levers being freely rotatable on the corresponding of said brake shafts, the other of said operating levers being keyed to the other corresponding of said brake shafts, and adjustable means for supporting said other of said operating levers on said one of said operating levers.

2. The device, as set forth in claim 1, wherein: said adjustable supporting means comprises spindle means.

3. The device, as set forth in claim 1, wherein: said adjustable supporting means comprises crank means.

4. The device, as set forth in claim 1, wherein: said adjustable supporting means comprises a pressure operated working cylinder.

5. A pressure operated braking device for vehicles comprising:

a force storing device including a spring adapted to be tensioned by pressure means, a braking linkage operatively connected with said spring force storing device such, that brakes are applied, said braking linkage being disposed between said spring force storing device and said brakes, means for releasing the braking effect caused by said spring force storing device, means for varying the length of said braking linkage, two shafts corresponding to and disposed between the wheel brakes of a vehicle axle, a first operating lever keyed to one of said shafts, a second operating lever rotatably and loosely mounted on the other of said shafts, said first and second operating levers being operatively connected with said force storing device, an additional lever keyed to said other of said shafts, an adjustable member operatively disposed between said second operating lever and said additional lever, and said additional lever supporting said second operating lever.

6. The pressure operating braking device, as set forth in claim 5 wherein: said adjustable member comprises a spindle.

7. The pressure operating braking device, as set forth in claim 5, wherein: said adjustable member comprises a crank.

8. The pressure operating braking device, as set forth in claim 5, wherein: said adjustable member comprises a working cylinder and a piston reciprocating therein.

References Cited

UNITED STATES PATENTS

| | | | |
|---|---|---|---|
| 1,867,078 | 7/1932 | Kazenmaier | 188—170 |
| 2,295,196 | 9/1942 | Barr | 188—170 |
| 3,090,359 | 5/1963 | Hoppenstand | 188—170 X |
| 3,095,067 | 6/1963 | Murty et al. | 188—170 |
| 3,136,399 | 6/1964 | Granryd | 188—170 X |
| 2,768,712 | 10/1956 | Phipps | 188—170 X |

DUANE A. REGER, *Primary Examiner.*